(12) United States Patent
Bhakta et al.

(10) Patent No.: US 12,050,322 B2
(45) Date of Patent: Jul. 30, 2024

(54) OPTICAL SYSTEMS WITH MULTIPLE LIGHT ENGINES FOR FOVEATION

(71) Applicant: Apple Inc., Cupertino, CA (US)

(72) Inventors: Vikrant Bhakta, Santa Clara, CA (US); Guolin Peng, Sunnyvale, CA (US); Hyungryul Choi, San Jose, CA (US); Scott M. DeLapp, San Diego, CA (US)

(*) Notice: Subject to any disclaimer, the term of this patent is extended or adjusted under 35 U.S.C. 154(b) by 0 days.

(21) Appl. No.: 18/152,012

(22) Filed: Jan. 9, 2023

(65) Prior Publication Data

US 2023/0341689 A1 Oct. 26, 2023

Related U.S. Application Data

(63) Continuation of application No. PCT/US2021/041278, filed on Jul. 12, 2021.
(Continued)

(51) Int. Cl.
*G02B 27/01* (2006.01)
*F21V 8/00* (2006.01)
(Continued)

(52) U.S. Cl.
CPC ........... *G02B 27/0172* (2013.01); *G02B 5/32* (2013.01); *G02B 6/0018* (2013.01);
(Continued)

(58) Field of Classification Search
CPC .... G02B 27/0172; G02B 5/32; G02B 6/0018; G02B 6/0025; G02B 6/0031; G02B 6/005; G02B 26/0858; G02B 26/0833; G02B 27/0093; G02B 27/1006; G02B 27/148; G02B 27/1066; G02B 2027/0174; G02B 2027/0147; G02B 2027/0178; G02F 1/0045

See application file for complete search history.

(56) References Cited

U.S. PATENT DOCUMENTS 9,983,413 B1 5/2018 Sahlsten et al.
2016/0379606 A1* 12/2016 Kollin .................. G03H 1/2294
345/428

(Continued)

FOREIGN PATENT DOCUMENTS

WO 2016027442 A1 2/2016
WO 2018100239 A1 6/2018

*Primary Examiner* — Christopher E Leiby
(74) *Attorney, Agent, or Firm* — Treyz Law Group, P.C.; Michael H. Lyons

(57) ABSTRACT

An electronic device may provide foveated images at an eye box. The device may have a first display module that produces a low resolution portion of the image and a second display module that produces a high resolution portion of the image. A reflective input coupling prism may be mounted to a waveguide. A steering mirror may overlap the prism. The mirror may receive the high resolution portion through the waveguide and the prism. The mirror may reflect the high resolution portion back into the waveguide and may be adjusted to shift a location of the high resolution portion within the image. For example, the steering mirror may adjust the position of the high resolution portion to align with the gaze direction at the eye box. A reflective surface of the prism may reflect the low resolution portion of the image into the waveguide.

20 Claims, 5 Drawing Sheets

Related U.S. Application Data

(60) Provisional application No. 63/051,328, filed on Jul. 13, 2020.

(51) Int. Cl.
    *G02B 5/32*         (2006.01)
    *G02B 26/08*       (2006.01)
    *G02B 27/00*       (2006.01)
    *G02B 27/10*       (2006.01)
    *G02B 27/14*       (2006.01)
    *G02F 1/00*        (2006.01)

(52) U.S. Cl.
    CPC ......... *G02B 6/0025* (2013.01); *G02B 6/0031* (2013.01); *G02B 6/005* (2013.01); *G02B 26/0858* (2013.01); *G02B 27/0093* (2013.01); *G02B 27/1006* (2013.01); *G02B 27/148* (2013.01); *G02F 1/0045* (2013.01); *G02B 2027/0174* (2013.01)

(56) References Cited

U.S. PATENT DOCUMENTS

| | | | |
|---|---|---|---|
| 2018/0275410 A1* | 9/2018 | Yeoh | G06T 19/006 |
| 2018/0284451 A1* | 10/2018 | Eash | G06F 3/011 |
| 2018/0324332 A1 | 11/2018 | Konttori et al. | |
| 2020/0310145 A1* | 10/2020 | Eash | G02B 27/286 |
| 2021/0055560 A1* | 2/2021 | Benítez | G02B 5/26 |
| 2022/0206295 A1* | 6/2022 | Calafiore | G02B 27/0101 |
| 2023/0168511 A1* | 6/2023 | Sluka | G02B 27/0179 359/630 |

* cited by examiner

OPTICAL SYSTEMS WITH MULTIPLE LIGHT ENGINES FOR FOVEATION

This application is a continuation of international patent application No. PCT/US2021/041278, filed Jul. 12, 2021, which claims the benefit of U.S. provisional patent application No. 63/051,328, filed Jul. 13, 2020, which are hereby incorporated by reference herein in their entireties.

BACKGROUND

This relates generally to optical systems and, more particularly, to optical systems for displays.

Electronic devices may include displays that present images to a user's eyes. For example, devices such as virtual reality and augmented reality headsets may include displays with optical elements that allow users to view the displays.

It can be challenging to design devices such as these. If care is not taken, the components used in displaying content may be unsightly and bulky, can consume excessive power, and may not exhibit desired levels of optical performance.

SUMMARY

An electronic device such as a head-mounted device may have one or more near-eye displays that produce images for a user. The head-mounted device may be a pair of virtual reality glasses or may be an augmented reality headset that allows a viewer to view both computer-generated images and real-world objects in the viewer's surrounding environment.

The near-eye display may provide foveated images to the eye box. The foveated images may have a high resolution portion and a low resolution portion. The display may include a high resolution display module that produces the high resolution light corresponding to the high resolution portion of the foveated image. The display may include a low resolution display module that produces the low resolution light corresponding to the low resolution portion of the foveated image.

The display may include a waveguide with an output coupler. A reflective input coupling prism may be mounted to the waveguide. The prism may have a reflective surface provided with a reflective coating. The reflective coating may have an opening. A steering element such as an input coupler steering mirror may overlap the opening. The steering mirror may receive the high resolution light through the waveguide, the prism, and the opening. The steering mirror may reflect the high resolution light back into the waveguide through the opening and the prism. The reflective surface (e.g., the reflective coating) may reflect the low resolution light into the waveguide. The steering mirror may be adjusted to shift a position of the high resolution portion of the foveated image within the eye box. For example, the steering mirror may adjust the position of the high resolution portion of the foveated image to align with the direction of a user's gaze at the eye box. The output coupler may couple the high and low resolution light out of the waveguide and towards the eye box (e.g., as the foveated image). An optional dispersion compensating wedge may be used. The steering mirror may be replaced with a liquid crystal steering element if desired.

DETAILED DESCRIPTION

Figure 1:
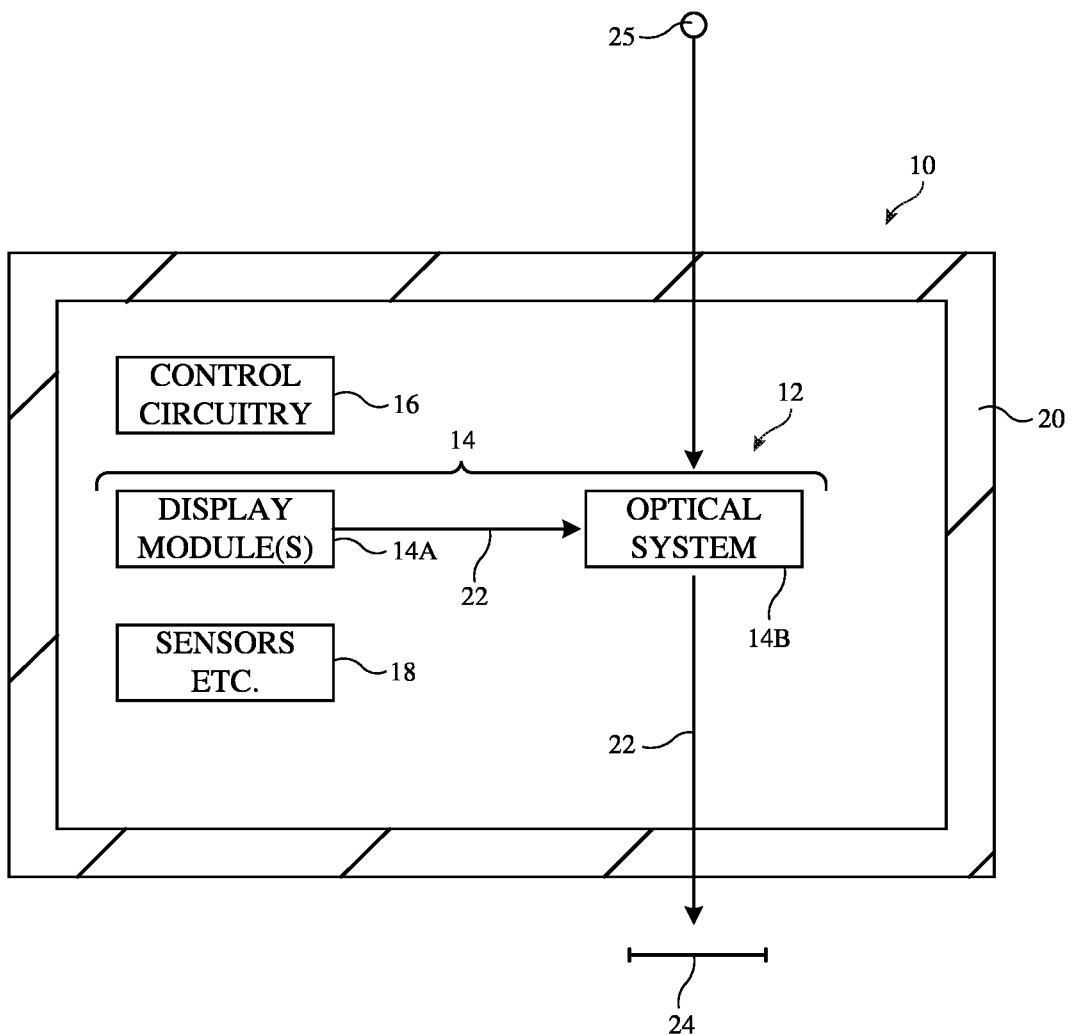
FIG. 1 is a diagram of an illustrative system having a display in accordance with some embodiments.

An illustrative system having a device with one or more near-eye display systems is shown in FIG. 1. System 10 may be a head-mounted device having one or more displays such as near-eye displays 14 mounted within support structure (housing) 20. Support structure 20 may have the shape of a pair of eyeglasses (e.g., supporting frames), may form a housing having a helmet shape, or may have other configurations to help in mounting and securing the components of near-eye displays 14 on the head or near the eye of a user. Near-eye displays 14 may include one or more display modules such as display modules 14A and one or more optical systems such as optical systems 14B. Display modules 14A may be mounted in a support structure such as support structure 20. Each display module 14A may emit light 22 (sometimes referred to herein as image light 22) that is redirected towards a user's eyes at eye box 24 using an associated one of optical systems 14B.

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code (instructions) may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.). In one suitable arrangement that is sometimes described herein as an example, components 18 may include gaze tracking sensors that gather gaze image data from a user's eye at eye box 24 to track the direction of the user's gaze in real time. As an example, the gaze tracking sensors may include infrared or other light emitters that emit infrared light or other light towards the eye box and image sensors that sense the infrared or other light reflected off of the user's eye (e.g., where the sensed light identifies the gaze direction of the user's eye).

Display modules 14A (sometimes referred to herein as display engines 14A, light engines 14A, or projectors 14A) may include reflective displays (e.g., displays having arrays of light sources that produce illumination light that reflect off of a reflective display panel to produce image light such as liquid crystal on silicon (LCOS) displays, digital-micromirror device (DMD) displays, or other spatial light modulators), emissive displays (e.g., micro-light-emitting diode (uLED) displays, organic light-emitting diode (OLED) displays, laser-based displays, etc.), or displays of other types. Light sources in display modules 14A may include uLEDs, OLEDs, LEDs, lasers, combinations of these, or any other desired light-emitting components.

Optical systems 14B may form lenses that allow a viewer (see, e.g., a viewer's eyes at eye box 24) to view images on display(s) 14. There may be two optical systems 14B (e.g., for forming left and right lenses) associated with respective left and right eyes of the user. A single display 14 may produce images for both eyes or a pair of displays 14 may be used to display images. In configurations with multiple displays (e.g., left and right eye displays), the focal length and positions of the lenses formed by components in optical system 14B may be selected so that any gap present between the displays will not be visible to a user (e.g., so that the images of the left and right displays overlap or merge seamlessly).

If desired, optical system 14B may contain components (e.g., an optical combiner, etc.) to allow real-world image light from real-world images or objects 25 to be combined optically with virtual (computer-generated) images such as virtual images in image light 22. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement in which a camera captures real-world images of object 25 and this content is digitally merged with virtual content at optical system 14B).

System 10 may, if desired, include wireless circuitry and/or other circuitry to support communications with a computer or other external equipment (e.g., a computer that supplies display 14 with image content). During operation, control circuitry 16 may supply image content to display 14. The content may be remotely received (e.g., from a computer or other content source coupled to system 10) and/or may be generated by control circuitry 16 (e.g., text, other computer-generated content, etc.). The content that is supplied to display 14 by control circuitry 16 may be viewed by a viewer at eye box 24.

Figure 2:
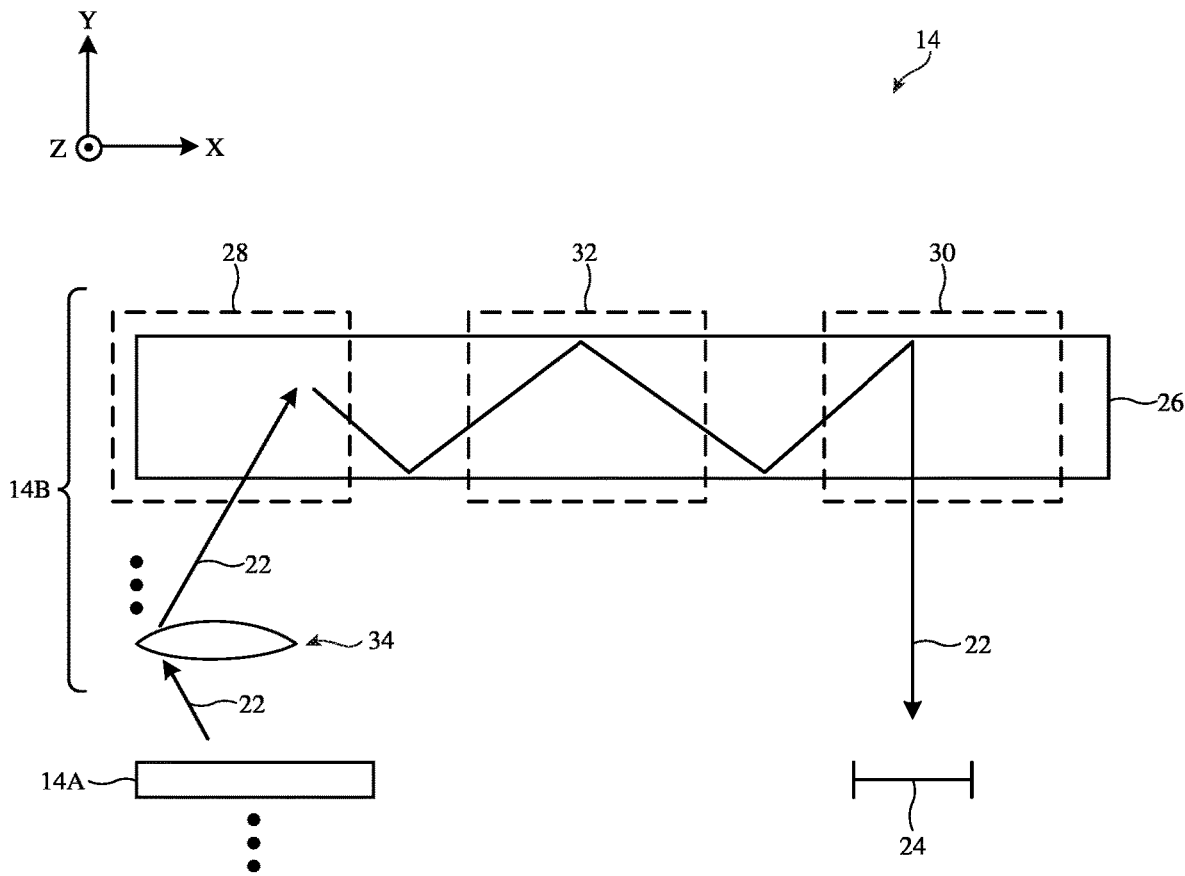
FIG. 2 is a top view of an illustrative optical system for a display having a waveguide with an input coupler in accordance with some embodiments.

FIG. 2 is a top view of an illustrative display 14 that may be used in system 10 of FIG. 1. As shown in FIG. 2, near-eye display 14 may include one or more display modules such as display module(s) 14A and an optical system such as optical system 14B. Optical system 14B may include optical elements such as one or more waveguides 26. Waveguide 26 may include one or more stacked substrates (e.g., stacked planar and/or curved layers sometimes referred to herein as waveguide substrates) of optically transparent material such as plastic, polymer, glass, etc.

If desired, waveguide 26 may also include one or more layers of holographic recording media (sometimes referred to herein as holographic media, grating media, or diffraction grating media) on which one or more diffractive gratings are recorded (e.g., holographic phase gratings, sometimes referred to herein as holograms). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating media may include photopolymers, gelatin such as dichromated gelatin, silver halides, holographic polymer dispersed liquid crystal, or other suitable holographic media.

Diffractive gratings on waveguide 26 may include holographic phase gratings such as volume holograms or thin-film holograms, meta-gratings, or any other desired diffractive grating structures. The diffractive gratings on waveguide 26 may also include surface relief gratings formed on one or more surfaces of the substrates in waveguides 26, gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles).

Optical system 14B may include collimating optics such as collimating lens 34. Collimating lens 34 may include one or more lens elements that help direct image light 22 towards waveguide 26. Collimating lens 34 may be omitted if desired. If desired, display module(s) 14A may be mounted within support structure 20 of FIG. 1 while optical system 14B may be mounted between portions of support structure 20 (e.g., to form a lens that aligns with eye box 24). Other mounting arrangements may be used, if desired.

As shown in FIG. 2, display module(s) 14A may generate image light 22 associated with image content to be displayed to eye box 24. Image light 22 may be collimated using a lens such as collimating lens 34. Optical system 14B may be used to present image light 22 output from display module(s) 14A to eye box 24.

Optical system 14B may include one or more optical couplers such as input coupler 28, cross-coupler 32, and output coupler 30. In the example of FIG. 2, input coupler 28, cross-coupler 32, and output coupler 30 are formed at or on waveguide 26. Input coupler 28, cross-coupler 32, and/or output coupler 30 may be completely embedded within the substrate layers of waveguide 26, may be partially embedded within the substrate layers of waveguide 26, may be mounted to waveguide 26 (e.g., mounted to an exterior surface of waveguide 26), etc.

The example of FIG. 2 is merely illustrative. One or more of these couplers (e.g., cross-coupler 32) may be omitted. Optical system 14B may include multiple waveguides that are laterally and/or vertically stacked with respect to each other. Each waveguide may include one, two, all, or none of couplers 28, 32, and 30. Waveguide 26 may be at least partially curved or bent if desired.

Waveguide 26 may guide image light 22 down its length via total internal reflection. Input coupler 28 may be configured to couple image light 22 from display module(s) 14A into waveguide 26, whereas output coupler 30 may be configured to couple image light 22 from within waveguide 26 to the exterior of waveguide 26 and towards eye box 24. Input coupler 28 may include an input coupling prism and a steering mirror or liquid crystal steering element. As an example, display module(s) 14A may emit image light 22 in direction +Y towards optical system 14B. When image light 22 strikes input coupler 28, input coupler 28 may redirect image light 22 so that the light propagates within waveguide 26 via total internal reflection towards output coupler 30 (e.g., in direction X). When image light 22 strikes output coupler 30, output coupler 30 may redirect image light 22 out of waveguide 26 towards eye box 24 (e.g., back along the Y-axis). In scenarios where cross-coupler 32 is formed at waveguide 26, cross-coupler 32 may redirect image light 22 in one or more directions as it propagates down the length of waveguide 26, for example.

Input coupler 28, cross-coupler 32, and/or output coupler 30 may be based on reflective and refractive optics or may be based on holographic (e.g., diffractive) optics. In arrangements where couplers 28, 30, and 32 are formed from reflective and refractive optics, couplers 28, 30, and 32 may include one or more reflectors (e.g., an array of micromirrors, partial mirrors, louvered mirrors, or other reflectors). In arrangements where couplers 28, 30, and 32 are based on holographic optics, couplers 28, 30, and 32 may include diffractive gratings (e.g., volume holograms, surface relief gratings, etc.).

In one suitable arrangement that is sometimes described herein as an example, output coupler 30 is formed from diffractive gratings or micromirrors embedded within waveguide 26 (e.g., volume holograms recorded on a grating medium stacked between transparent polymer waveguide substrates, an array of micromirrors embedded in a polymer layer interposed between transparent polymer waveguide substrates, etc.), whereas input coupler 28 includes a prism mounted to an exterior surface of waveguide 26 (e.g., an exterior surface defined by a waveguide substrate that contacts the grating medium or the polymer layer used to form output coupler 30) and a scanning mirror or liquid crystal steering element.

It may be desirable to display high resolution images using display 14. However, in practice, the human eye may only be sensitive enough to appreciate the difference between higher resolution and lower resolution image data near the center of its field of view (e.g., a user may be less sensitive to low resolution image data in portions of the image at the periphery of the user's field of view). Providing high resolution image data within the entirety of the field of view may consume an excessive amount of processing resources, optical resources, and space within display 14, particularly given that users are only sensitive to high resolution image data near the center of the field of view. Display 14 may therefore be a foveated display that displays only critical portions of an image at high resolution to help reduce the burdens on system 10.

In general, increasing the physical size of display module(s) 14A will increase the maximum resolution of the images that can be displayed using image light 22. However, space is often at a premium in compact systems such as system 10 of FIG. 1. It would therefore be desirable to be able to provide high resolution images while also conserving processing and optical resources in system 10, without further increasing the size of display module(s) 14A.

In order to provide high resolution images without undesirably burdening the resources of system 10, display 14 may be configured to perform dynamic foveation operations on image light 22. In some scenarios, the display module itself displays portions of an image that are near the center of the user's field of view with higher resolution, whereas portions of the image that are far from the center of the user's field of view are displayed with lower resolution. However, displaying higher and lower resolution portions of the image with the same display module may cause the display module to consume an excessive amount of power and may cause the display module to occupy an excessive amount of space in display 14. In order to mitigate these issues while still allowing for satisfactory foveation operations, display 14 may include two relatively small display modules 14A. One of the display modules may display image light 22 corresponding to the higher resolution portion whereas the other display module displays image light 22 corresponding to the lower resolution portion of the image. Input coupler 28 may include a scanning mirror or a liquid crystal steering element that moves the higher resolution portion of the image to follow the user's gaze within the field of view over time.

As the user's gaze changes over time, input coupler 28 may adjust the portions of the image that are produced with the higher resolution so that that portion remains at the center of the user's gaze. Gaze tracking components (e.g., image sensors in components 18 of FIG. 1) may actively track the location of the user's gaze over time. Information about the direction of the user's gaze may be used to shift the location of the higher resolution portion of the image to follow the center of the user's gaze. The images in image light 22 may thereby be foveated images (e.g., dynamically foveated images in which the higher resolution portions of the image are re-located over time to follow/track the user's gaze).

Figure 3:
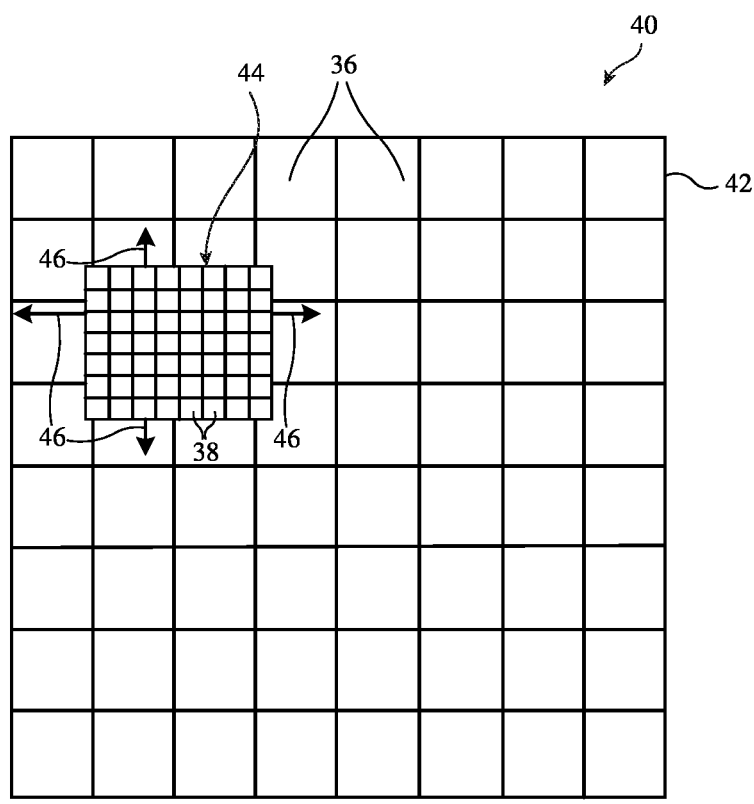
FIG. 3 is a diagram of an illustrative foveated image having an adjustable high resolution region that may be output by an optical system of the type shown in FIG. 2 in accordance with some embodiments.

FIG. 3 is a diagram showing a foveated image that may be produced by display 14. Image light 22 of FIG. 2 may include a foveated image such as foveated image 40 of FIG. 3 (e.g., as produced by two display modules 14A). Foveated image 40 may include pixels. As shown in FIG. 3, foveated image 40 may include lower resolution pixels 36 in regions 42 (sometimes referred to herein as lower-resolution regions 42, low-resolution regions 42, or low-resolution portions 42) and higher-resolution pixels 38 in region 44 (sometimes referred to herein as higher-resolution region 44, high-resolution region 44, or high-resolution portion 44). Higher-resolution region 44 may be produced by a first display module 14A (e.g., a high resolution and low field of view display module 14A). Lower-resolution region 42 may be produced by a second display module 14A (e.g., a low resolution and high field of view display module 14A).

The low resolution display module 14A may, for example, optically provide the pixels in lower-resolution regions 42 with higher magnification and thus lower resolution and lower pixel pitch while the high resolution display module 14A concurrently provides the pixels in higher-resolution region 44 with lower magnification and thus higher resolution and higher pixel pitch. Lower-resolution regions 42 may, for example, be peripheral regions that run around the periphery of higher-resolution region 44 (e.g., along the periphery of the field of view of the user's gaze at any given time). Higher-resolution region 44 may, for example, be located at the center of the user's gaze at any given time. Components 18 of FIG. 1 may gather gaze tracking data that identifies the location of the user's gaze. As the direction of the user's gaze changes over time, control circuitry 16 (FIG. 1) may control input coupler 28 (e.g., a scanning mirror or liquid crystal steering element in input coupler 28) to shift the location of higher-resolution region 44 (e.g., based on the gaze tracking data) to align higher-resolution region 44 with the center of the user's gaze, as shown by arrows 46.

Because foveated image 40 has a higher resolution within region 44 than within regions 42, the user (e.g., at eye box 24 of FIG. 2) may perceive foveated image 40 as a high resolution image (e.g., because the user's eye is sensitive to the higher resolution within region 44 and is insensitive to the lower resolution within regions 42). This may allow the images displayed at eye box 24 to effectively appear as high resolution images without requiring an increase in the size of display module(s) 14A or the processing and optical resources of system 10, even if the user shifts the direction of their gaze over time (e.g., the foveation may be dynamically performed by display module 14A without imposing any increased burden on the other components in system 10). The example of FIG. 3 is merely illustrative. Regions 44 and 42 may have any desired shapes and/or sizes. Foveated image 40 may have any desired shape and/or size and may include any desired number of pixels (sometimes referred to herein as image pixels).

Figure 4:
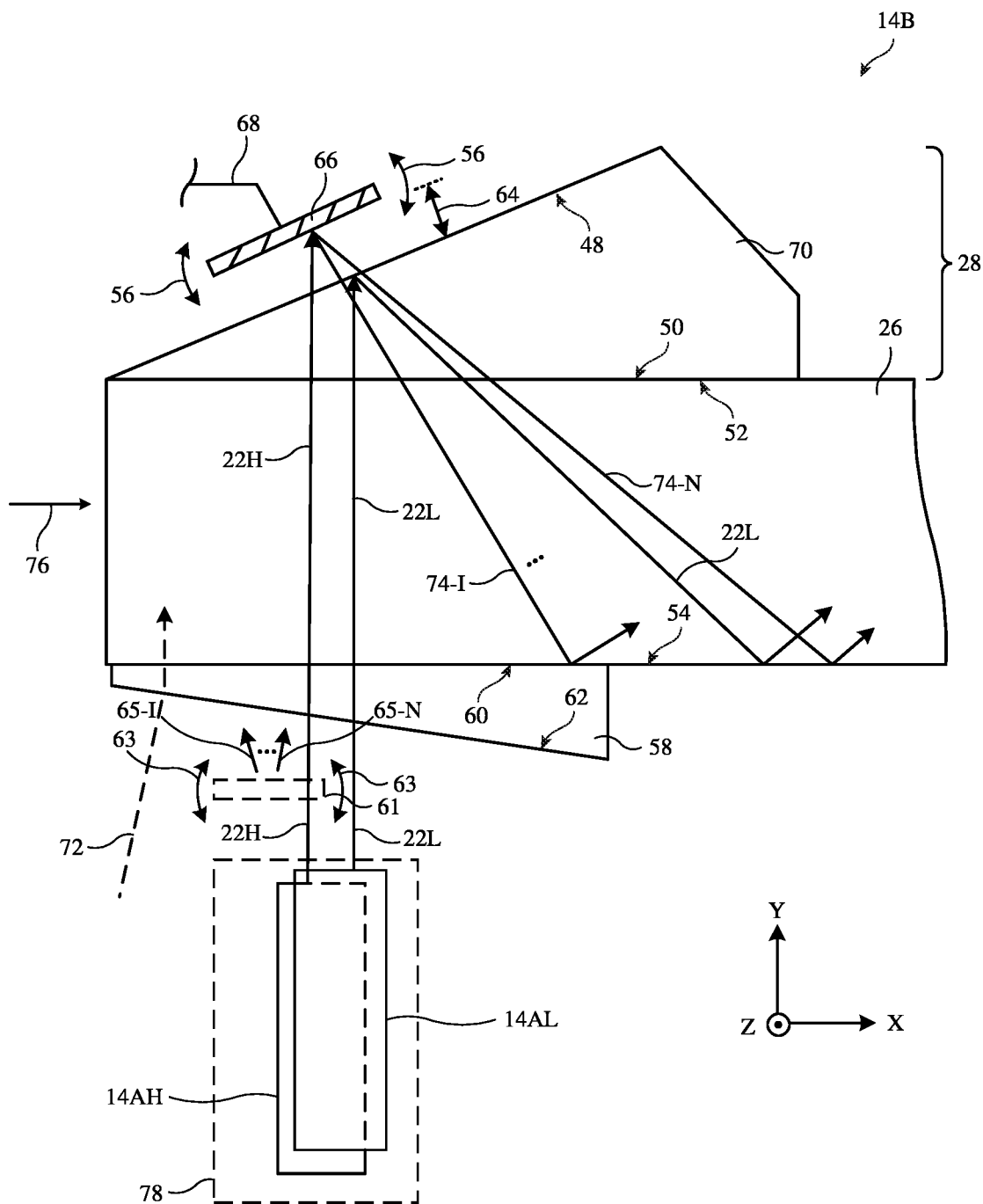
FIG. 4 is a top view of an illustrative optical system having a reflective input coupling prism, high and low resolution display modules, and a scanning mirror for outputting a foveated image of the type shown in FIG. 3 in accordance with some embodiments.

FIG. 4 is a top view showing how input coupler 28 at waveguide 26 may include a prism, a scanning mirror, and low and high resolution display modules for performing foveation operations. As shown in FIG. 4, input coupler 28 may include a prism (e.g., a reflective input coupling prism) such as prism 70. Prism 70 may have a bottom surface 50 mounted to exterior surface 52 of waveguide 26 (e.g., using an optically clear adhesive not shown in FIG. 4 for the sake of clarity).

As shown in FIG. 4, display 14 may have two display modules 14A such as a first display module 14AH and a second display module 14AL. Display module 14AH may generate image light 22H. Image light 22H may have a relatively small field of view and a relatively high resolution. Display module 14AH may therefore sometimes be referred to herein as high resolution display module 14AH or small field of view display module 14AH. Image light 22H may sometimes be referred to herein as high resolution image light 22H or small field of view image light 22H.

Display module 14AL may generate image light 22L. Image light 22L may have a relatively wide field of view and a relatively low resolution (e.g., image light 22H may have a first resolution and a first field of view whereas image light 22L has a second resolution that is less than the first resolution and a second field of view that is wider than the first field of view). Display module 14AL may therefore sometimes be referred to herein as low resolution display module 14AL or wide field of view display module 14AL. Image light 22L may sometimes be referred to herein as low resolution image light 22L or wide field of view image light 22L.

High resolution image light 22H and low resolution image light 22L may combine to produce image light 22 of FIG. 2. For a given image frame (e.g., foveated image 40 of FIG. 3), high resolution image light 22H may produce the higher-resolution region 44 of the image frame (e.g., having higher-resolution pixels 38 of FIG. 3) whereas low resolution image light 22L produces the lower-resolution regions 42 of the image frame (e.g., having lower resolution pixels 36 of FIG. 3). Collimating optics such as lens 34 of FIG. 2 (not shown in FIG. 4 for the sake of clarity) may direct high resolution image light 22H and low resolution image light 22L towards prism 70.

Low resolution display module 14AL and high resolution display module 14AH may each occupy less volume and may each consume less power than a single display module that is used to produce foveated images. For example, a single display module that produces foveated images may occupy volume 78 whereas low resolution display module 14AL and high resolution display module 14AH each occupy less volume than volume 78. Low resolution display module 14AL and high resolution display module 14AH may, for example, collectively occupy less volume than volume 78.

Prism 70 may be mounted to the side of waveguide 26 opposite to display modules 14AH and 14AL. For example, waveguide 26 may have an exterior surface 54 that opposes exterior surface 52. Exterior surface 54 may be interposed between prism 70 and display modules 14AH and 14AL (e.g., waveguide 26 may be interposed between prism 70 and display modules 14AH and 14AL). Image light 22H and 22L may enter waveguide 26 through surface 54 (e.g., at a sufficiently low angle with respect to the normal surface of surface 54 such that no total internal reflection occurs). Image light 22H and 22L may pass through surface 52 of waveguide 26 into prism 70. Prism 70 may have a surface 48 opposite surface 50. Surface 48 may be tilted in one or more directions (e.g., including out of the plane of the page, where the normal axis of surface 48 is oriented at a non-zero angle with respect to the +Y axis within the Z-Y plane in addition to a non-zero angle with respect to the +Y axis within the X-Y plane). Surface 48 may be curved if desired. Surface 48 may sometimes be referred to herein as the reflective surface of prism 70.

Prism 70 may couple low resolution image light 22L and high resolution image light 22H into waveguide 26 (e.g., at angles such that the image light propagates down waveguide 26 via total internal reflection). Low resolution image light 22L may reflect off of surface 48 and into waveguide 26. Low resolution image light 22L may subsequently propagate down waveguide 26 via total internal reflection (e.g., until hitting cross coupler 32 or output coupler 30 of FIG. 2). If desired, a reflective coating may be layered over surface 48 to help reflect low resolution image light 22L into waveguide 26. The reflective coating may be layered over some but not all of surface 48. For example, the reflective coating may be layered over portions of surface 48 that do not receive high resolution image light 22H from high resolution display module 14AH.

Input coupler 28 may include a switchable reflective structure (surface) such as steering mirror 66 that overlaps surface 48 (sometimes referred to herein as input coupler steering mirror 66). High resolution image light 22H may pass through surface 48 of prism 70 (e.g., without reflecting off of surface 48 or a reflective coating layered onto surface 48) and may reflect off of input coupler steering mirror 66 back into prism 70 and waveguide 26, as shown by arrows 74. The high resolution image light 22H may subsequently propagate down waveguide 26 via total internal reflection (e.g., until hitting cross coupler 32 or output coupler 30 of FIG. 2). Input coupler steering mirror 66 may serve to shift the angle at which high resolution image light 22H is coupled into waveguide 26. In turn, this may serve to shift the location of the higher-resolution region 44 of the foveated image 40 (FIG. 3) displayed at eye box 24 (e.g., this may serve to steer the high resolution region of the foveated image to follow the user's gaze, as shown by arrows 46 of FIG. 3).

As shown in FIG. 4, input coupler steering mirror 66 may overlap some but not all or may overlap all of surface 48 of prism 70. Input coupler steering mirror 66 may include, for example, a microelectromechanical systems (MEMS) scanning mirror, a piezoelectric mirror, a liquid crystal (LC) steering element, a digital micromirror device (DMD), or other reflective structures that are switchable between at least first and second states (e.g., orientations or angles with respect to surface 48 of prism 70).

Input coupler steering mirror 66 may receive control signals over control path 68 (e.g., from control circuitry 16 of FIG. 1) that place input coupler steering mirror 66 into a selected one of the states (orientations) at any given time. Control circuitry 16 may adjust the state (orientation) of input coupler steering mirror 66 by rotating/tilting mirror 66 in the pupil plane, as shown by arrows 56. Input coupler steering mirror 66 may be a one-dimensional (1D) steering or scanning mirror rotatable over a single degree of freedom or may be a two-dimensional (2D) steering or scanning mirror rotatable over two degrees of freedom (e.g., about the Z-axis and about any other desired axis such as an axis that is non-parallel with respect to the Z-axis).

Input coupler steering mirror 66 may be separated from surface 48 of prism 70 by non-zero separation distance 64. Separation distance 64 may be selected to allow input coupler steering mirror 66 to rotate freely without hitting prism 70 across the range of motion of the mirror. High resolution display module 14AH and lens 34 (FIG. 2) may focus a pupil of high resolution image light 22H onto input coupler steering mirror 66 (e.g., high resolution display module 14AH and lens 34 of FIG. 2 may create a pupil of high resolution image light 22H at the location of input coupler steering mirror 66). Input coupler steering mirror 66 may be rotatable over any desired range of angles (e.g., a range of 5 degrees, a range of 10 degrees, a range of greater than 5 degrees, a range of greater than 10 degrees, etc.). If desired, an optional coating such as an anti-reflective (AR) coating or other coatings may be layered over the portion of surface 48 that transmits high resolution image light 22H to input coupler steering mirror 66. If desired, input coupler steering mirror 66 may impart a non-zero optical power to the high resolution image light 22H coupled into waveguide 26. Prism 70 may include multiple wedges of materials having different indices of refraction if desired. The wedges may have curved interfaces or interfaces that are tilted in one or more directions if desired.

Input coupler steering mirror 66 may be rotatable over N states (orientations). Input coupler steering mirror 66 may couple high resolution image light 22H into waveguide 26 at a different respective angle in each of the N states (e.g., to move higher-resolution region 44 of foveated image 40 of FIG. 3 to a desired location within the field of view of eye box 24 such as a location that tracks the direction of the user's gaze). For example, in a first state (orientation), input coupler steering mirror 66 may couple high resolution image light 22H into waveguide 26 at a first angle as shown by arrow 74-1, in an Nth state (orientation), input coupler steering mirror 66 may couple high resolution image light 22H into waveguide 26 at an Nth angle as shown by arrow 74-N, etc. Arrows 74 may be confined to a single plane (e.g., in scenarios where mirror 66 is a 1D steering mirror) or may extend beyond a single plane (e.g., in scenarios where mirror 66 is a 2D steering mirror).

The high resolution image light 22H coupled into waveguide 26 by input coupler steering mirror 66 may have a corresponding relatively-small field of view (e.g., as provided by high resolution display module 14AH). Control circuitry 16 may rapidly adjust (toggle) the state (orientation) of input coupler steering mirror 66 to direct high resolution image light 22H to a particular portion (subset) of the relatively large field of view at eye box 24 (FIG. 2) at any given time. The remaining portions of the field of view at eye box 24 may be filled with the low resolution image light 22L produced by low resolution display module 14AL and reflected off of surface 48 of prism 70. The particular portion of the relatively large field of view to provide with high resolution image light 22H may be the portion within which the user's gaze is located (e.g., based on gaze tracking data gathered by system 10), in one suitable arrangement. As examples, the field of view at eye box 24 may be 60 degrees, between 55 and 65 degrees, greater than 45 degrees, greater than 55 degrees, or any other desired angle greater than field of view of high resolution image light 22H as incident upon waveguide 26. The example in which input coupler steering mirror 66 is scanned over N discrete states (angles) is merely illustrative. If desired, input coupler steering mirror 66 may be adjusted over a continuous range of different angles.

If desired, an optional optical wedge such as wedge 58 may be interposed on the optical path between waveguide 26 and display modules 14AL and 14AH. Image light 22H and 22L may pass through wedge 58 before passing through waveguide 26. Wedge 58 may have a first surface 60 facing waveguide 26 and an opposing second surface 62 facing the display modules. Surface 60 may be coupled to surface 54 of waveguide 26 (e.g., surface 60 may be adhered to surface 54 using optically clear adhesive if desired) or may be spaced apart from surface 54 of waveguide 26. Second surface 62 of wedge 58 may be tilted at a non-parallel angle with respect to surface 54 of waveguide 26. Wedge 58 may help redirect image light 22H and 22L incident at other angles (e.g., angles non-parallel with respect to the Y-axis) towards prism 70, as shown by dashed arrow 72. This may allow display modules 14AH and/or 14AL to be mounted at different locations or orientations with respect to waveguide 26 than would otherwise be possible in the absence of wedge 58. For example, wedge 58 may allow display modules 14AH and/or 14AL to be located within a main frame for waveguide 26 (e.g., within support structures 20 of FIG. 1) without needing to be located in the temple or other portions of the support structures (e.g., thereby optimizing space consumption within system 10). If desired, wedge 58 may be a dispersion compensation wedge that compensates for dispersion of image light 22H and 22L by prism 70 (e.g., in scenarios where prism 70 has a refractive index as a function of wavelength that is different from the bulk refractive index as a function of wavelength of the grating medium in waveguide 26). Wedge 58 may be omitted or replaced with other optical elements such as lens elements if desired. Surfaces 60, 62, 52, and/or 54 may be provided with antireflective coatings, reflective coatings, any other desired coatings, or no coatings if desired.

In another suitable arrangement, input coupler steering mirror 66 may be replaced by a switchable transmissive element such as liquid crystal steering element 61. In these scenarios, prism 70 may be a reflective prism as shown in FIG. 4 or may be a transmissive input coupling prism mounted to surface 54 of waveguide 26. Liquid crystal steering element 61 may receive control signals over a control path (not shown) that rotate (switch) liquid crystal steering element 61 between N states (orientations), as shown by arrows 63. Liquid crystal steering element 61 may be a 1D steering element or a 2D steering element. Liquid crystal steering element 61 may receive high resolution image light 22H from high resolution display module 14AH without receiving low resolution image light 22L (e.g., liquid crystal steering element 61 may be interposed in the optical path of high resolution image light 22H but not the optical path of low resolution image light 22L).

Liquid crystal steering element 61 may couple high resolution image light 22H at a different respective angle in each of the N states, as shown by arrows 65 (e.g., at a first angle as shown by arrow 65-1 in a first state, at an Nth angle as shown by arrow 65-N in an Nth state, etc.). Control circuitry 16 may rapidly adjust (toggle) the state of liquid crystal steering element 61 to direct high resolution image light 22H to a particular portion (subset) of the relatively large field of view of eye box 24 (FIG. 2) at any given time (e.g., to shift the location of higher-resolution region 44 in foveated image 40 of FIG. 3 to track the direction of the user's gaze over time). Low resolution image light 22L may continue to fill the remainder of the field of view of the eye box that is not filled by high resolution image light 22H. The example in which liquid crystal steering element 61 is scanned over N discrete states (angles) is merely illustrative. If desired, liquid crystal steering element 61 may be continuously adjusted over a continuous range of different angles.

Figure 5:
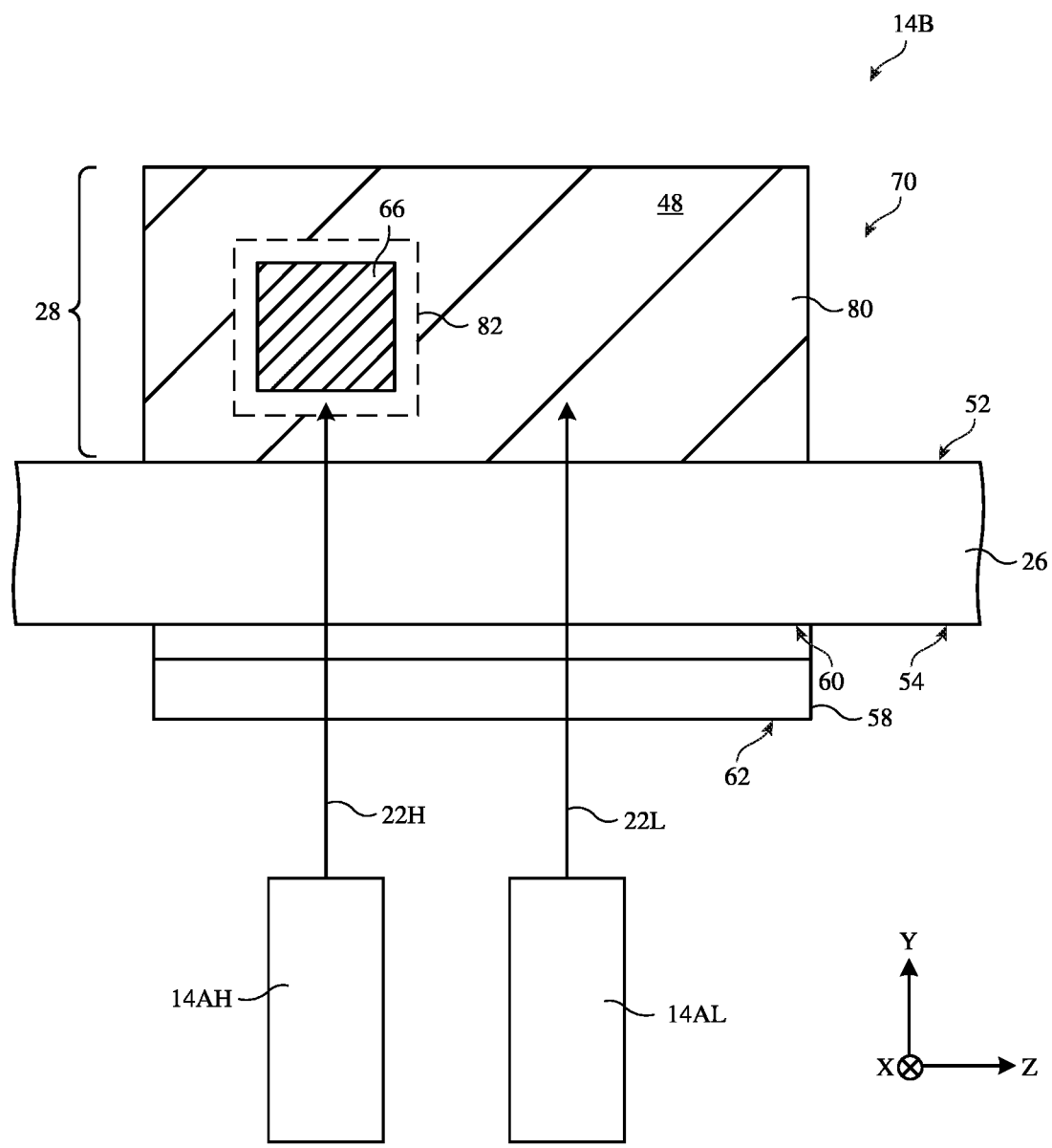
FIG. 5 is a side view of an illustrative optical system of the type shown in FIG. 4 in accordance with some embodiments.

FIG. 5 is a side view taken in the direction of arrow 76 of FIG. 4. As shown in FIG. 5, surface 48 of prism 70 may be provided with a reflective coating such as reflective coating 80. Reflective coating 80 may cover some or all of surface 48 except for uncovered region 82 of surface 48 (e.g., uncovered region 82 may be formed from an opening in reflective coating 80). Uncovered region 82 may be a portion of surface 48 that is free from reflective coating 80. Low resolution display module 14AL may direct low resolution image light 22L towards the region (portion) of surface 48 covered by reflective coating 80 (e.g., low resolution display module 14AL may be aligned with a portion of surface 48 that does not include uncovered region 82). Reflective coating 80 may reflect low resolution image light 22L to couple the low resolution image light into waveguide 26. In another suitable arrangement, reflective coating 80 may be omitted and low resolution image light 22L may be incident upon surface 48 at such an angle that surface 48 itself reflects low resolution image light 22L into waveguide 26.

At the same time, high resolution display module 14AH may direct high resolution image light 22H towards uncovered region 82 of surface 48 (e.g., high resolution display module 14AH may be aligned with uncovered region 82 of surface 48). Uncovered region 82 may be completely surrounded by reflective coating 80 or may be partially surrounded by reflective coating 80 (e.g., one, more than one, or every side of uncovered region 82 may be defined by reflective coating 80). Uncovered region 82 may have a square shape, a rectangular shape, or any other desired shape having any desired number of curved and/or straight edges. Input coupler steering mirror 66 may overlap uncovered region 82. Because uncovered region 82 is free from reflective coating 80, high resolution image light 22H may pass through region 82 of surface 48 (e.g., without reflecting off of surface 48) and may be incident upon input coupler steering mirror 66. Input coupler steering mirror 66 may then reflect high resolution image light 22H back through uncovered region 82 of surface 48, and prism 70 may couple the high resolution image light into waveguide 26 (e.g., at a corresponding angle as determined by the present orientation of input coupler steering mirror 66, as shown by arrows 74 of FIG. 4). Wedge 58 may perform dispersion compensation for image light 22H and 22L if desired.

In accordance with an embodiment, a display system configured to provide a foveated image to an eye box, the display system is provided that includes a first display module configured to generate first light associated with a first portion of the foveated image, a second display module configured to generate second light associated with a second portion of the foveated image, the second portion has a higher resolution than the first portion, a waveguide having a lateral surface, an input coupling prism having a reflective surface oriented at a non-parallel angle with respect to the lateral surface of the waveguide, an input coupler steering mirror overlapping the input coupling prism, the reflective surface is configured to reflect the first light into the waveguide, the reflective surface is configured to transmit the second light to the input coupler steering mirror, and the input coupler steering mirror is configured to reflect, into the waveguide, the second light that is transmitted by the reflective surface, and an output coupler on the waveguide and configured to couple the first and second light out of the waveguide as the foveated image.

In accordance with another embodiment, the input coupler steering mirror is adjustable between a plurality of orientations and the input coupler steering mirror is configured to reflect the second light at a different respective angle in each orientation of the plurality of orientations.

In accordance with another embodiment, the display system includes control circuitry coupled to the input coupler steering mirror, and a gaze tracking sensor, the gaze tracking sensor is configured to gather gaze tracking data that identifies a gaze direction at the eye box and the control circuitry is configured to switch the input coupler steering mirror between the plurality of orientations to align a location of the second portion of the foveated image with the gaze direction identified by the gaze tracking data.

In accordance with another embodiment, the first display module includes a reflective display panel selected from the group consisting of: a liquid crystal on silicon (LCOS) display panel and a digital-micromirror device (DMD) display panel.

In accordance with another embodiment, the second display module includes an additional reflective display panel selected from the group consisting of: an additional LCOS display panel and an additional DMD display panel.

In accordance with another embodiment, the first display module includes light sources selected from the group consisting of: light-emitting diodes, micro light-emitting diodes, organic light-emitting diodes, and lasers.

In accordance with another embodiment, the display system includes a reflective coating layered on the reflective surface of the input coupling prism, the reflective coating is configured to reflect the first light into the waveguide.

In accordance with another embodiment, the reflective coating includes an opening, the second light is transmitted by the reflective surface within the opening, and the input coupler steering mirror at least partially overlaps the opening.

In accordance with another embodiment, the input coupler steering mirror includes a structure selected from the group consisting of: a microelectromechanical systems (MEMS) scanning mirror, a piezoelectric mirror, a liquid crystal (LC) steering element, and a digital micromirror device (DMD).

In accordance with another embodiment, the display system includes a dispersion compensation wedge interposed between the waveguide and the first and second display modules, the dispersion compensation wedge is configured to transmit the first and second light.

In accordance with another embodiment, the waveguide is interposed between the input coupling prism and the first and second display modules.

In accordance with another embodiment, the output coupler includes volume holograms.

In accordance with an embodiment, an optical system is provided that includes a first display module configured to generate first light corresponding to a first portion of an image a second display module configured to generate second light corresponding to a second portion of the image, the first portion has a wider field of view than the second portion, a waveguide having an output coupler configured to couple the first and second light out of the waveguide and towards an eye box, a reflective input coupling prism having a reflective surface configured to receive the first light through the waveguide and configured to reflect the first light back into the waveguide, and a steering mirror configured to receive the second light through the waveguide and the reflective input coupling prism, the steering mirror is configured to reflect the second light into the waveguide.

In accordance with another embodiment, the steering mirror is configured to adjust a location of the second portion of the image within the eye box.

In accordance with another embodiment, the optical system includes a gaze tracking sensor, the gaze tracking sensor is configured to gather gaze tracking data that identifies a gaze direction at the eye box and the steering mirror is configured to adjust the location of the second portion of the image based on the gathered gaze tracking data.

In accordance with another embodiment, the optical system includes a reflective coating on the reflective input coupling prism, the reflective coating is configured to reflect the first light, the reflective coating has an opening that overlaps the steering mirror, and the steering mirror is configured to receive the second light through the opening.

In accordance with another embodiment, the optical system includes a grating medium in the waveguide, the output coupler includes volume holograms in the grating medium.

In accordance with another embodiment, the optical system includes a dispersion compensating wedge mounted to the waveguide and optically interposed between the waveguide and the first and second display modules.

In accordance with an embodiment, a display system configured to provide a foveated image to an eye box, the display system is provided that includes a first display module configured to generate first light associated with a first portion of the foveated image, a second display module configured to generate second light associated with a second portion of the foveated image, the second portion has a higher resolution than the first portion, a waveguide having an output coupler configured to couple the first and second light out of the waveguide and towards the eye box, an input coupling prism mounted to the waveguide, the input coupling prism is configured to couple the first and second light into the waveguide, and a liquid crystal steering element interposed between the second display module and the waveguide, the liquid crystal steering element is configured to transmit the second light and the liquid crystal steering element is configured to adjust a location of the second portion within the foveated image.

In accordance with another embodiment, the liquid crystal steering element does not transmit the first light.

The foregoing is merely illustrative and various modifications can be made to the described embodiments. The foregoing embodiments may be implemented individually or in any combination.

What is claimed is:

1. A display system configured to provide a foveated image to an eye box, the display system comprising:
    a first display module configured to generate first light associated with a first portion of the foveated image;
    a second display module configured to generate second light associated with a second portion of the foveated image, wherein the second portion has a higher resolution than the first portion;
    a waveguide having a lateral surface;
    an input coupling prism having a reflective surface oriented at a non-parallel angle with respect to the lateral surface of the waveguide;
    an input coupler steering mirror overlapping the input coupling prism, wherein the reflective surface is configured to reflect the first light into the waveguide, wherein the reflective surface is configured to transmit the second light to the input coupler steering mirror, and wherein the input coupler steering mirror is configured to reflect, into the waveguide, the second light that is transmitted by the reflective surface; and
    an output coupler on the waveguide and configured to couple the first and second light out of the waveguide as the foveated image.

2. The display system defined in claim 1, wherein the input coupler steering mirror is adjustable between a plurality of orientations and wherein the input coupler steering mirror is configured to reflect the second light at a different respective angle in each orientation of the plurality of orientations.

3. The display system defined in claim 2, further comprising:
    control circuitry coupled to the input coupler steering mirror; and
    a gaze tracking sensor, wherein the gaze tracking sensor is configured to gather gaze tracking data that identifies a gaze direction at the eye box and wherein the control circuitry is configured to switch the input coupler steering mirror between the plurality of orientations to align a location of the second portion of the foveated image with the gaze direction identified by the gaze tracking data.

4. The display system defined in claim 1, wherein the first display module comprises a reflective display panel selected from the group consisting of: a liquid crystal on silicon (LCOS) display panel and a digital-micromirror device (DMD) display panel.

5. The display system defined in claim 4, wherein the second display module comprises an additional reflective display panel selected from the group consisting of: an additional LCOS display panel and an additional DMD display panel.

6. The display system defined in claim 1, wherein the first display module comprises light sources selected from the group consisting of: light-emitting diodes, micro light-emitting diodes, organic light-emitting diodes, and lasers.

7. The display system defined in claim 1, further comprising:
a reflective coating layered on the reflective surface of the input coupling prism, wherein the reflective coating is configured to reflect the first light into the waveguide.

8. The display system defined in claim 7, wherein the reflective coating comprises an opening, wherein the second light is transmitted by the reflective surface within the opening, and wherein the input coupler steering mirror at least partially overlaps the opening.

9. The display system defined in claim 1, wherein the input coupler steering mirror comprises a structure selected from the group consisting of: a microelectromechanical systems (MEMS) scanning mirror, a piezoelectric mirror, a liquid crystal (LC) steering element, and a digital micromirror device (DMD).

10. The display system defined in claim 1, further comprising:
a dispersion compensation wedge interposed between the waveguide and the first and second display modules, wherein the dispersion compensation wedge is configured to transmit the first and second light.

11. The display system defined in claim 1, wherein the waveguide is interposed between the input coupling prism and the first and second display modules.

12. The display system defined in claim 1, wherein the output coupler comprises volume holograms.

13. An optical system comprising:
a first display module configured to generate first light corresponding to a first portion of an image;
a second display module configured to generate second light corresponding to a second portion of the image, wherein the first portion has a wider field of view than the second portion;
a waveguide having an output coupler configured to couple the first and second light out of the waveguide and towards an eye box;
a reflective input coupling prism having a reflective surface configured to receive the first light through the waveguide and configured to reflect the first light back into the waveguide; and
a steering mirror configured to receive the second light through the waveguide and the reflective input coupling prism, wherein the steering mirror is configured to reflect the second light into the waveguide.

14. The optical system defined in claim 13, wherein the steering mirror is configured to adjust a location of the second portion of the image within the eye box.

15. The optical system defined in claim 14, further comprising:
a gaze tracking sensor, wherein the gaze tracking sensor is configured to gather gaze tracking data that identifies a gaze direction at the eye box and wherein the steering mirror is configured to adjust the location of the second portion of the image based on the gathered gaze tracking data.

16. The optical system defined in claim 13, further comprising:
a reflective coating on the reflective input coupling prism, wherein the reflective coating is configured to reflect the first light, wherein the reflective coating has an opening that overlaps the steering mirror, and wherein the steering mirror is configured to receive the second light through the opening.

17. The optical system defined in claim 13, further comprising:
a grating medium in the waveguide, wherein the output coupler comprises volume holograms in the grating medium.

18. The optical system defined in claim 17, further comprising a dispersion compensating wedge mounted to the waveguide and optically interposed between the waveguide and the first and second display modules.

19. A display system configured to provide a foveated image to an eye box, the display system comprising:
a first display module configured to generate first light associated with a first portion of the foveated image;
a second display module configured to generate second light associated with a second portion of the foveated image, wherein the second portion has a higher resolution than the first portion;
a waveguide having an output coupler configured to couple the first and second light out of the waveguide and towards the eye box;
an input coupling prism mounted to the waveguide, wherein the input coupling prism is configured to couple the first and second light into the waveguide; and
a liquid crystal steering element interposed between the second display module and the waveguide, wherein the liquid crystal steering element is configured to transmit the second light and wherein the liquid crystal steering element is configured to adjust a location of the second portion within the foveated image.

20. The display system defined in claim 19, wherein the liquid crystal steering element does not transmit the first light.

* * * * *